United States Patent [19]
Enander

[11] 3,778,031
[45] Dec. 11, 1973

[54] TREE FELLING GUIDER

[75] Inventor: Per Henry Enander, Svedbro, Gnarp, Sweden

[73] Assignee: Skogsdon Aktiebolag, Stockholm, Sweden

[22] Filed: Mar. 16, 1972

[21] Appl. No.: 235,234

[30] Foreign Application Priority Data
May 17, 1971 Sweden.............................. 6406/71

[52] U.S. Cl. ...................................... 254/1, 254/133
[51] Int. Cl. ............................ B66f 1/00, B66f 3/00
[58] Field of Search............................... 254/1, 133; 144/34 A

[56] References Cited
UNITED STATES PATENTS
1,477,298   12/1923   Templeton.......................... 254/133
2,583,945   1/1952   Jacobs ............................... 254/133

Primary Examiner—Othell M. Simpson
Attorney—Frank A. Follmer

[57]  ABSTRACT

A tree felling guider in which a rod is adapted to be supported at one end on the ground in an inclined position with its other end provided with means to engage the tree trunk. The trunk engaging means comprises a stepping wheel provided with pointed teeth and means for rotating the wheel in one direction so that the rod end will move along the tree trunk toward its root. There is also provided a pawl for preventing rotation of the wheel in the opposite direction.

8 Claims, 2 Drawing Figures

3,778,031

PATENTED DEC 11 1973

TREE FELLING GUIDER

BACKGROUND OF THE INVENTION

The present invention refers to a tree felling guider provided with a rod which, in the tree felling operation, is brought into an inclining position between a point of support on the ground and the main stem or trunk of the tree to be felled, and whose end intended to bear on the tree trunk has a step feeding device. The latter is arranged to cooperate with the tree trunk, so that its said end will then move along the tree stem towards its root end.

Rod-like tree felling guiders are known in prior art. These are designed by variation of its length by means of a jack-like hydraulic clamping means to be fixed in between a spot on the ground and the stem of the tree to be felled. Tree felling guiders of the said kind are comparatively heavy and clumsy and, moreover, complicated in design and thus also expensive to manufacture. The changing of the rod length determined by the stroke of the hydraulic device is fairly limited.

SUMMARY OF THE INVENTION

By the tree felling guider according to the invention the above said drawbacks are practically totally eliminated in that the step feeding device consists of a stepping wheel provided with gripper means and means by which the wheel can be made to rotate in one direction, as well as a catch or locking device arranged to prevent the rotation of the wheel in the opposite direction. The gripper means of the stepping wheel is preferably composed of pointed teeth located about its circumference.

The arrangement for rotating the wheel should be designed as a power amplifying transmission device and can in its simplest embodiment consist of a preferably angular lever provided with a feeding device. This structure will become particularly simple and reliable if the feeding device is made to cooperate directly with the teeth of the stepping wheel and if the catch and locking device is a pawl likewise directly meshing with the teeth of the stepping gear.

BRIEF DESCRIPTION OF THE DRAWING

A tree felling guider according to the invention is described hereafter with reference to the accompanying drawing which in FIG. 1 shows a lateral view of the same in its operational position, and in FIG. 2 shows the upper portion of the tree felling guider on an enlarged scale.

DESCRIPTION OF THE PREFERRED EMBODIMENT

Figure 2:
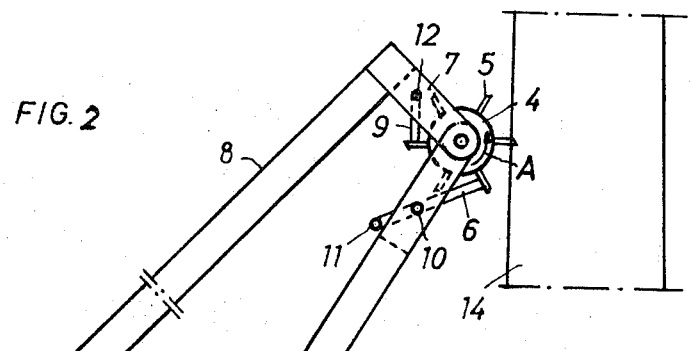
Figure 1:
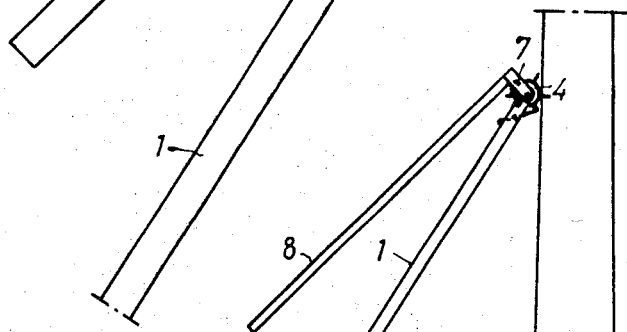
Figure 1:

The tree felling guider as illustrated in the drawing comprises a rod 1 provided at its lower end with a foot consisting of a supporting and gripping plate 2 which is suitably joined to the rod 1 by articulation. The rod 1, although not shown, may consist of two portions which may slide telescopically or be collapsible by means of an articulation and also through a locking device fixable inter se in the operational position. The supporting and gripping plate 2 is suitably provided about its circumference with grippers 3 or the like preventing it from sliding on the ground.

The rod 1 is provided at its upper end with a step feeding device comprising (1) a wheel 4, having a number of suitably pointed teeth 5 arranged to be equally spaced about its circumference and forming gripping means, (2) a paul 6 cooperating with said teeth, and (3) a transmission device made up by a bell crank 7, 8 and an arm 9 pivotally suspended on the same. The bell crank 7, 8 is pivoted on the shaft of wheel 4, and the arm 9 is provided to cooperate with the wheel teeth 5. The upper end of rod 1 and the lever portion 7 are suitably forkshaped, with the wheel 4 arranged between the fork branches thus formed. The pawl 6, which is pivotally arranged on a shaft 10 and held in mesh with the teeth 5 of wheel 4 by a counter weight 11, is located between the legs of rod 1 and the arm 9, which is pivotally born on a shaft 12 and is in turn arranged between the legs of bell crank portion 7.

As will be seen by the drawing, when in operation the implement is placed in an inclining position between the ground 13 and the tree 14 to be felled. The foot 2 will then rest on the ground 13 and the wheel 4 will engage the tree trunk with one or more teeth 5 the tree trunk. By reciprocally pivoting the bell crank 7, 8 about the center of wheel 4, this wheel revolves in the direction of arrow A in which a way that, with the bell crank turning in one direction, the wheel 4 will be entrained by the feeder 9 while, when turning the bell crank 7, 8 in the other direction, the wheel 4 will be prevented from revolving in the opposite sense by the pawl 6 which by the effect of the counterweight 11 is brought to mesh with a suitable clearing.

In this manner the step feeding device causes the upper end of the rod 1 to be fed or caused to travel stepwise downwardly along the tree stem.

The tree felling guider, as described hereinbefore, and illustrated in the drawing, may be modified with respect to its details within the scope of the idea of the invention. The transmission device may, for example, be made as a worm gear cooperating with wheel 4 and operated manually by a crank or the like.

I claim:

1. A tree felling guider comprising a rod adapted, when in tree felling operation to be located between a point of support on the ground and a tree stem, the upper end of said rod adjacent the tree stem having mounted thereon means for moving the upper end of said rod along the tree stem towards its root end, said last-named means including a step feeding device comprising a stepping wheel including gripper means engageable with the tree stem, revolving means by which said wheel can be step actuated to turn in one direction, and means adapted to prevent the wheel from revolving in the opposite direction.

2. A tree felling guided according to claim 1, characterized in that said gripper means of the wheel includes teeth suitably equipped with points.

3. A tree felling guider according to claim 1, characterized in that said device for rotating the stepping wheel is a power amplifying transmission device.

4. A tree felling guider according to claim 3 characterized in that said transmission device comprises an angular lever including a feeding means.

5. A tree felling guider according to claim 4, characterized in that said feeding means consists of a feeding arm made to cooperate with said wheel gripper means.

6. A tree felling guider according to claim 2 characterized in that said means for preventing the wheels from revolving comprises a pawl cooperating with the said teeth.

7. A tree felling guider according to claim 2, characterized in that said device for rotating the stepping wheel is a power amplifying transmission device.

8. A tree felling guider according to claim 7, characterized in that said device for rotating the stepping wheel is a power amplifying transmission device and said transmission device comprises an angular lever including a feeding means.

* * * * *